J. A. STEINMETZ.
METHOD OF DESTROYING AIRCRAFT.
APPLICATION FILED APR. 11, 1916.
1,217,657.
Patented Feb. 27, 1917.
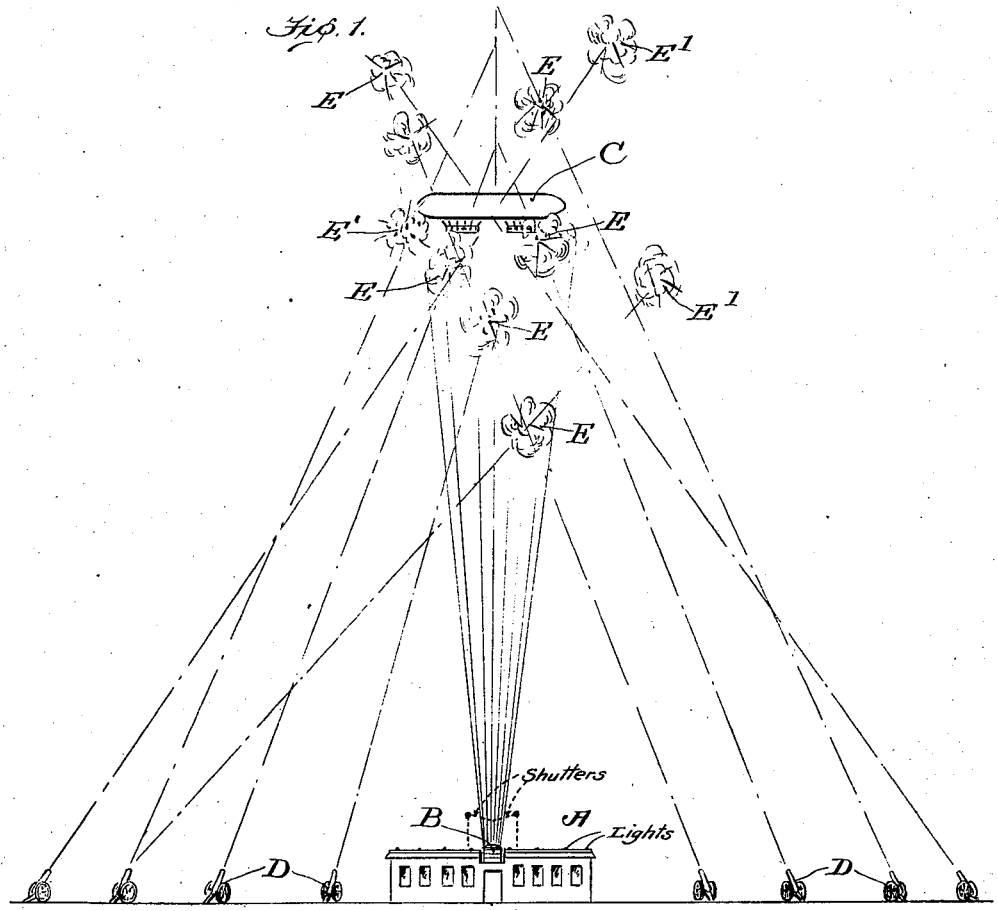
Fig. 1.
Fig. 2.
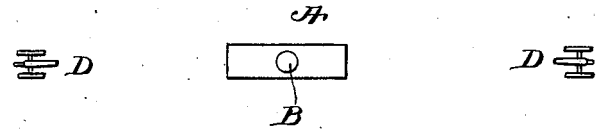
Witness
Edwin L. Bradford
Inventor
Jos. A. Steinmetz
By
Wallace Greene,
Attorney

UNITED STATES PATENT OFFICE.

JOSEPH A. STEINMETZ, OF PHILADELPHIA, PENNSYLVANIA.

METHOD OF DESTROYING AIRCRAFT.

1,217,657.  Specification of Letters Patent.  Patented Feb. 27, 1917.

Application filed April 11, 1916. Serial No. 90,390.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in Methods of Destroying Aircraft, of which the following is a specification, reference being had therein to the accompanying drawing.

The object of this invention is to provide unusually effective means for the destruction of air craft, and this end is attained by luring the hostile craft to a point where it can do little harm and is itself in a position chosen with a view to its destruction.

Advantage is taken of the fact that attacks by air-craft, particularly so-called zeppelins, are usually made at night when the machine being at a very considerable height the location of important buildings or plants must be judged largely by their illumination, and of the fact that for dropping bombs with fair accuracy the air craft usualy hovers over the point which it is desired to reach with bombs. By lighting lures, for example unimportant or even dummy structures, giving them an apparent importance which they do not have in fact, the hostile craft is induced to remain for an appreciable time in fairly constant position above such structures, and anti-aircraft guns are made ready for quickly sending timed shells to various heights directly over such structures and powerful search-lights are arranged for illuminating for any desired intervals the region in which the aircraft must be in order to drop bombs effectively.

In the accompanying diagrammatic drawings,

Figure 1 is a side elevation illustrating the method and apparatus employed.

Fig. 2 is a corresponding plan view illustrating a possible arrangement of guns about a structure intended to invite attack.

In these views, A represents any land structure whatever, for example, fortifications, cathedral, factory, legislative halls, military post, having at a central point a readily controlled searchlight B arranged for projecting a powerful light beam upwardly, and C a zeppelin far above A and in the path of said beam. About the point A and preferably at various distances therefrom are arranged anti-aircraft guns D, normally set at such angles that the various lines of fire intersect said beam at progressively increasing heights so that without taking time to adjust the angle of fire some one or more of the guns may be in position to explode a shell in the immediate vicinity of an aircraft at any ordinary height, the shell being timed to explode approximately at the instant when it reaches the line of the light beam.

Broken lines in Fig. 1 indicate lines of fire, and explosions are indicated at points E above and below the structure C. Obviously, by varying the time between discharge and explosion the converging shells may be made to explode at points E' before or after they reach points vertically over the structure A. It is thus possible by using all or many of the guns at nearly the same time to fill the air, over the region of A at all desirable distances above the latter, with projectiles, so completely that any aircraft at the moment seeking to drop bombs upon A can hardly escape destruction. The illumination of the structure A may be by any suitable means within or without that region, or structure, it being quite possible to employ the searchlight beam itself when it is cut off from the upper air.

It is also plain that this beam may be sent upward momentarily and then be cut off if it reveals no aircraft, and that instead of a land structure, A may be on the water and the guns also be afloat.

The guns are preferably trained as stated so that in case the light beam illumines any hostile craft shells may, almost on the instant, be exploded in its vicinity; but this does not prevent changing the aim of the guns at will to reach any aircraft within the radius of fire.

I claim:

1. The method of destroying aircraft which consists in providing lures adapted to draw the attack of bomb-dropping aircraft by simulating importance which they lack, and in arranging anti-aircraft guns for sending projectiles simultaneously over said devices at varying heights.

2. The method of destroying aircraft at night, which consists in providing a structure intended to invite attack by such craft, mounting about such structure suitable guns trained to meet, approximately, at different heights, a vertical line from said structure, and illuminating the structure; whereby aircraft vertically above said structure may be substantially in the line of fire of some of said guns.

3. The method of defending at night against bomb-dropping aircraft which consists in providing a structure inviting attack by the dropping of bombs, illuminating said structure, providing a series of guns located about said structure in position to send projectiles over the same at various heights, and means for at will turning an illuminating beam upon any craft directly above said structure.

4. The method of destroying aircraft which consists in providing devices of small value simulating structures adapted to draw attack from bomb-dropping aircraft, arranging a series of anti-aircraft guns in position for sending projectiles directly over said devices but at various heights, and providing searchlights adapted to be cut off or at will to project a light beam upwardly from substantially the location of said devices.

In testimony whereof I affix my signature in presence of two witnesses.

JOSEPH A. STEINMETZ.

Witnesses:
ARTHUR S. MINSTER,
JOSEPH D. MORELL.